United States Patent [19]

Murai

[11] 4,255,887

[45] Mar. 17, 1981

[54] ILLUMINANT DISPLAY DEVICE AND MOTOR LICENSE PLATE USING SAME

[75] Inventor: Tetsunosuke Murai, Tokyo, Japan

[73] Assignee: Nihon Number Plate Kabushiki Kaisha, Tokyo, Japan

[21] Appl. No.: 32,682

[22] Filed: Apr. 23, 1979

[30] Foreign Application Priority Data

Jul. 28, 1978 [JP] Japan ............................ 53/103058[U]
Mar. 26, 1979 [JP] Japan ..................................... 54/34305

[51] Int. Cl.³ ............................................... G09F 13/08
[52] U.S. Cl. ........................................ 40/206; 315/360
[58] Field of Search .......................... 40/204, 205, 206; 340/99; 315/360

[56] References Cited

U.S. PATENT DOCUMENTS

| | | | |
|---|---|---|---|
| 1,250,644 | 12/1917 | Pelton | 40/204 |
| 1,363,893 | 12/1920 | Merkle | 40/206 |
| 1,368,026 | 2/1921 | Diver | 40/205 |
| 1,457,206 | 5/1923 | Benjamin | 40/205 |
| 1,471,337 | 10/1923 | Johnson | 40/205 |
| 1,538,491 | 5/1925 | Reed | 340/99 X |
| 1,667,126 | 4/1928 | Martin | 40/205 |
| 1,800,603 | 4/1931 | Carlson | 40/205 |
| 1,884,049 | 10/1932 | McCormack | 40/204 |
| 2,156,806 | 5/1939 | Ducey | 40/205 |
| 2,608,013 | 8/1952 | Marsala | 40/206 |
| 3,521,391 | 7/1970 | Murai | 40/591 X |
| 4,122,371 | 10/1978 | Talmage et al. | 315/360 X |

*Primary Examiner*—John F. Pitrelli
*Attorney, Agent, or Firm*—Toren, McGeady and Stanger

[57] ABSTRACT

The disclosed illuminant display device is to be used on a motor vehicle for publicity or other purposes. In the device an opaque plate member contains perforations in the shape of a character or figure to be displayed, and tinted translucent pieces are set in the perforations transmit light which is projected from a light source provided behind the perforated plate. The display device can serve as an illuminant license plate which is arranged to illuminate the identifying characters continuously for a predetermined time period after the headlight or parking light of the motor vehicle has been turned off and thereby foil a driver who tries to conceal the identity of the vehicle by turning off the lights for hit-and-run or other unlawful purposes.

4 Claims, 11 Drawing Figures

ILLUMINANT DISPLAY DEVICE AND MOTOR LICENSE PLATE USING SAME

BACKGROUND OF THE INVENTION

This invention relates to an illuminant display device which is particularly useful as a medium of advertisement or as a license plate to be mounted at the front and rear of a motor vehicle.

SUMMARY OF THE INVENTION

It is an object of the present invention to provide an illuminant display device with an improved effect for publicity.

It is another object of the invention to provide an illuminant license plate which can prevent the malicious attempt of drivers who try to leave the scene of an accident or evading identification of their cars by turning off headlights and parking lights.

One object is achieved by an illuminant display device which comprises: a flat casing open in the front and internally provided with an illuminating means; a plate member of an opaque material covering the opening of the front of the casing and having the outer surface thereof divided into at least two plate sections of different colors, the plate sections each having perforations in the shape of characters or figures to be illuminated; and translucent pieces set in the perforations and tinted in colors which contrasts with the colors of the respective plate sections.

Another object is achieved by an illuminant license plate device comprising: a license plate of an opaque material having perforations in the shape of identifying characters; translucent pieces set in the perforated characters of the license plate; a light source located inside of the license plate for projecting light toward the translucent pieces; switch means provided in a power supply circuit of the headlight or parking light of the vehicle; and a delay circuit provided in the power supply circuit of the light source to maintain the same in a closed state for a predetermined time period after the headlight or parking light have been turned off.

The above and other objects, features and advantages of the invention will be apparent from a reading of the ensuing part of the specification in conjunction with the accompanying drawings which indicate the embodiments of the invention.

DESCRIPTION OF THE PREFERRED EMBODIMENTS

Figure 1:
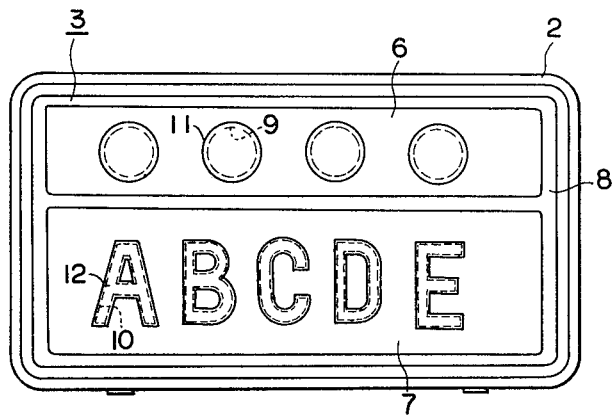
FIG. 1 is a diagrammatic front view of an illuminant display device according to the instant invention.
Figure 2:
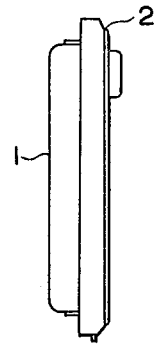
FIG. 2 is a side view of the display device of FIG. 1.
Figure 3:
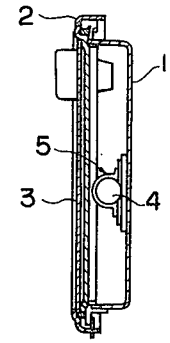
FIG. 3 is a cross-sectional view of the same display device.
Figure 4:
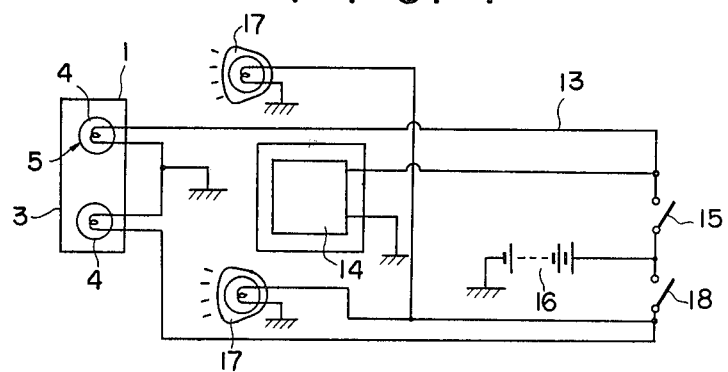
FIG. 4 is a diagram of a power supply circuit.
Figure 5:
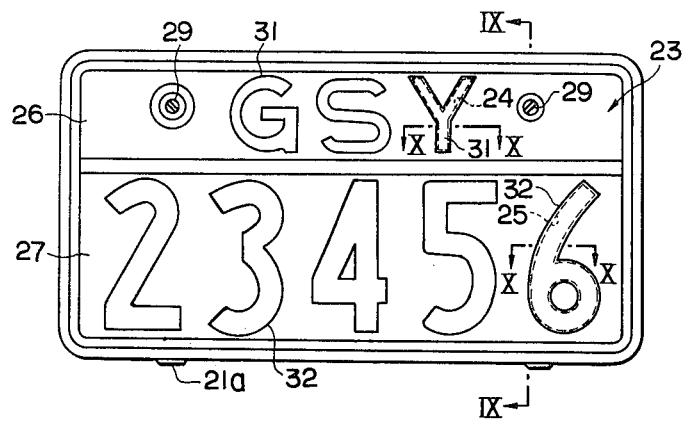
FIG. 5 is a diagrammatic front view of a motor license plate employing the illuminant display device of the invention.
Figure 6:
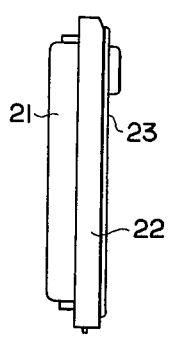
FIG. 6 is a side view of the license plate of FIG. 5.

In FIGS. 1 to 4, the illuminant display device according to the present invention includes a flat casing 1 with an open frame 2 on the open front thereof. The open front of the casing 1 is covered with a plate member 3 composed of, for instance, an aluminum plate which is secured to the open frame 2. The inside of the casing 1 is provided with an illuminating device 5 including electric lamps 4 which are supplied with electric power through suitable wiring.

In the particular embodiment shown, the outer surface of the plate member 3 is divided into upper and lower sections 6 and 7 of different colors. For example, the upper plate section 6 is painted white and the lower plate section 7 black, while the bordering portions around and between the respective plate sections are left unpainted to expose the color of the aluminum plate itself.

The upper and lower plate portions 6 and 7 are provided with cutout or perforated portions 9 and 10, respectively, in the form of characters or figures to be displayed thereon. The perforated characters 9 and 10 are fitted with colored light transmitting pieces 11 and 12, respectively, of translucent synthetic resin material or other suitable light transmitting material. The light transmitting material is securely fitted in the respective perforations by hot-press setting. For vividness of the light transmitting pieces 11 and 12 in the perforations 9 and 10, a material of a color which contrasts with the backgrounds provided by the upper and lower plate sections are selected, for instance, a green light transmitting material for the white upper plate sections 6 and a white light transmitting material for the black lower plate section 7. However, it is possible to employ other designs for the plate member 3, by dividing its outer surface in different ways and using different combinations of colors.

The circuit 13 which contains the electric lamps 4 is connected to a power source 16 through an on-off switch 15 of a control circuit 14 which controls the rotation of the prime mover of the vehicle. For instance: an electric circuit which controls the operation of a fuel injector in the case where the prime mover is a gasoline-powered engine. The circuit 13 also contains headlights 17 and a light switch 18.

Figure 9:
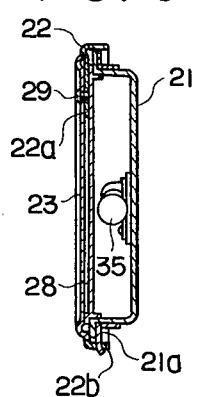
FIG. 9 is a sectional view taken on line IX—IX of FIG. 5.
Figure 10:
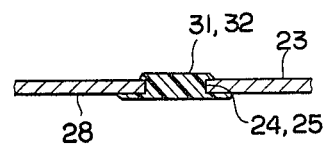
FIG. 10 is a sectional view of a license plate taken on line X—X of FIG. 5.

With the foregoing arrangement, when the lamps 4 of the illuminating device 5 are lit, their light is transmitted through the translucent pieces 11 and 12 in the perforations 9 and 10, clearly displaying in illuminated form a slogan, a sign or symbol of ownership or other presentations expressed by the perforated charactors or FIGS. 9 and 10.

In addition, the illuminant display device may be used to indicate an insignia of the maker or a nickname of the vehicle, or one can use it as a license plate as shown in FIGS. 5 to 11.

Referring now to FIGS. 5 to 11, the flat casing 21 has on its open front a door frame 22 which has its top supported by hinges on the casing 21. The door frame 22 has inwardly extending flanges at its swingable sides as shown at 22a (FIG. 9), to which a license plate 23 is fixedly clamped by screws 29. Thereby to mount the license plate 23 securely on the frame 22. The door frame 22 is provided with notches 22b at the bottom for engagement with locking projections 21b on the side of the casing 21. By engaging the notches 22b with the locking projections 21a, the door frame 22 is fixed in the closed position on the casing 21.

The license plate 23 has perforated openings 24 and 25 in the form of identifying characters and figures. The upper plate section 26 containing the perforated characters 24 and the lower plate section 27 containing the perforated FIGS. 25 are painted in white and black, respectively. Fitted in the perforated openings of the identifying characters 24 and FIGS. 25 are light transmitting pieces 31 and 32 of translucent synthetic resin material which are set in their respective openings by hot pressing from the inner side of the license plate 23 as shown in FIG. 10. The light transmitting pieces 31 and 32 are tinted in recognizable colors, for instance, in green and white, respectively.

Figure 7:
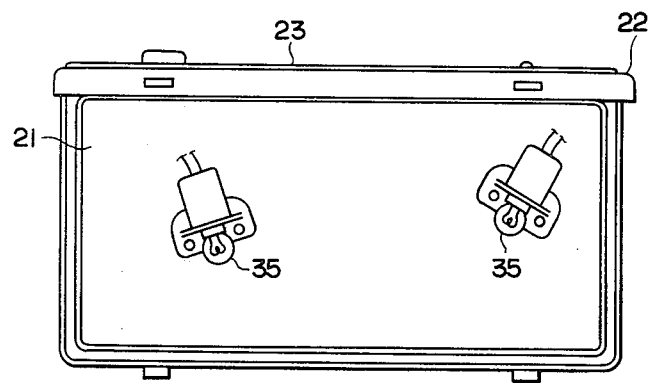
FIG. 7 is an interior view of a license plate casing.

Electric lamps (or illuminating lights) 35 are mounted within the casing 21 in opposite end portions thereof (FIG. 7).

Figure 8:
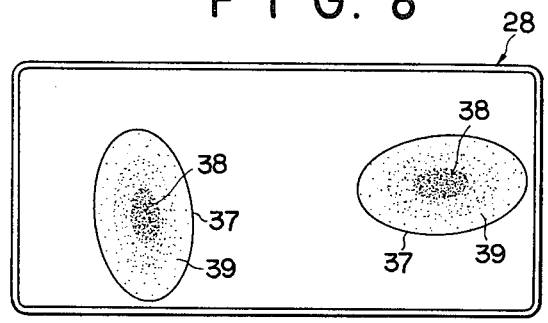
FIG. 8 is a front view of a light distributor plate.

Referring to FIG. 8, a light distributor plate 28 is located between the electric lamps 35 and the license plate 23, the light distributor plate 28 is composed of, for example, a milk-white transparent or translucent material. The light distributor plate 28 has oval transparent masking sheets 37 adhered thereto at the positions over the electric lamps 35 to lower the transparency in those portions. The masking sheet 37 is shaded gradually from its peripheral portions 39 toward its center portions 38 for uniform light distribution. Light from the electric lamps 35 is therefore sufficiently and uniformly distributed by the distributor plate 28 before reaching the perforated characters 24 and FIGS. 25 of the license plate 23. It follows that the colored light transmitting pieces in the perforated characters and figures of the license plate 23 are uniformly illuminated from inside.

Figure 11:
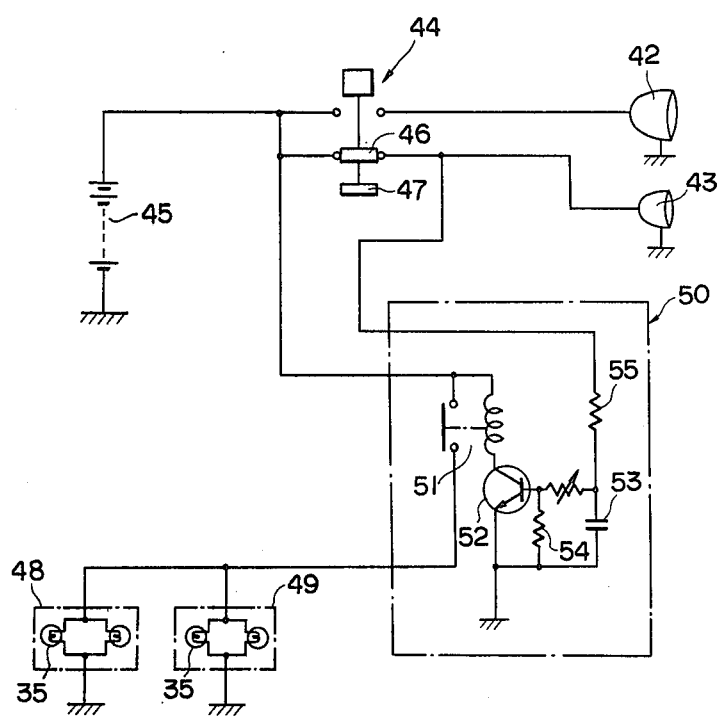
FIG. 11 is a diagram of a power supply circuit with a delay circuit for the illuminating lights.

Referring to FIG. 11, a headlight 42 and a parking light 43 of the vehicle are connected to a battery 45 through a light switch 44 which includes contact elements 46 and 47. The contact elements 46 and 47 of the light switch 44 can assume three different positions, viz., a first position in which both the headlight 42 and parking light 43 are off, a second position in which only the parking light 43 is on through the contact element 46, and a third position in which both the headlight 42 and parking light 43 are on through the contact elements 46 and 47, respectively. The front and rear license plates 48 and 49 of the vehicle are connected to the battery 45 through a common delay circuit 50. The delay circuit 50 includes a relay 51 which is connected between the battery 45 and illuminating lamps 35 to control the energizing current of the relay 51, and a capacitor 53 and a resistor 54 which are connected parallel with each other between the base and emitter of the switching transistor 52. The capacitor 53 is connected between the light switch 44 and the parking light 43 through a resistor 55.

When the light switch 44 is in the second or third position, current flows through the resistors 54 and 55, and keeps the base of the switching transistor 52 at a predetermined voltage. As a result, the switching transistor 52 is turned on and supplies energizing current to the relay 51 to close the power supply circuit for the illuminating lamps 35. Therefore, the illuminating lamps 35 are lit, and the capacitor 53 is charged to a potential determined by the resistor 54.

If the light switch 44 is shifted to the first position from the second or third position, the connection between the light switch 44 and the parking light 43 is eliminated. However, since the terminal voltage of the capacitor 53 is discharged through the resistor 54, the base of the switching transistor 52 is maintained above the predetermined potential for a predetermined time period, for instance, for 15 to 30 seconds, even after the shift to the first position of the light switch 44. In this manner, energizing current is still supplied to the relay 51 to complete the power circuit of the illuminating lamps 35 in the closed state thereby to keep the illuminating lights 35 continuedly on for a predetermined period after the headlight 42 and/or parking light 43 has been turned off.

Upon lapse of the predetermined time after the shift to the first position of the light switch 44, the capacitor 53 is fully discharged and the base voltage of the switching transistor 52 drops below the predetermined level, so that the switching transistor 52 is opened to de-energize the relay 51. As a result, the power supply circuit for the illuminating lamps 35 is opened to turn off the illuminating lights 35.

It is clear from the foregoing description that the identifying characters 24 and FIGS. 25 in the license plate 23 are illuminated by light which is uniformly transmitted through the light transmitting members 31 and 32, and in addition, the illuminating lights 35 are kept on for a predetermined time period after the headlight 42 and parking light 43 have been turned off. Therefore, the identifying characters and figures are clearly visible at night and the clear visibility is retained for a predetermined time period after the headlights 42 and parking lights 43 have been turned off.

The foregoing arrangement foils the malicious intention of a driver who tries to escape from the scene of an accident by turning off the vehicle (headlights and parking light) turned off to conceal the identity of the vehicle. In spite of the driver's intention, the illuminating lights 35 of the license plate remain on to defy the attempt of a hit-and-run.

The turn-off of the illuminating lights 35 is delayed from that of the headlight 42 and parking light 43 by a limited time period (15 to 30 seconds in the foregoing embodiment) to prevent the discharge of the battery which would otherwise be caused if the driver forgets to turn off the illuminating lights 35 while switching off other lights when parking or stopping the vehicle.

What is claimed is:

1. For a vehicle with a power supply circuit, headlamps, parking lamps and a switch for connecting the headlamps and parking lamps to the power supply circuit, an illuminant license plate device comprising:

a license plate of an opaque material having perforations in the shape of identifying characters;

a light source located inward of said license plate for projecting light toward said translucent pieces;

switch means in the power supply circuit for energizing the light source;

a delay circuit in the power supply circuit to maintain the switch means to the light source in a closed state for a predetermined time period after said headlight or parking light has been turned off; and a light distributor plate interposed between said light source and said license plate and having a transparent masking sheet adhered to a position opposite said light source, said masking sheet having a density increasing in degree from peripheral portions toward the center thereof to distribute the light uniformly from said light source before transmission through said translucent pieces in said license plate;

said delay circuit including a capacitor and a resistor in parallel with each other;

said delay circuit further including a switching element operable in relation to the terminal voltage of said capacitor to control opening and closing of said power supply circuit of said light source;

said translucent pieces being heat pressed to the license plate at the perforations for securing the pieces in the plate.

2. A device as in claims 1, wherein the colors of said translucent pieces in one plate are different from the colors of the pieces in the other plate section.

3. A device as in claims 1, wherein a plurality of said translucent pieces represent alphanumeric characters, each of the characters represented being continuous and complete, said perforations receiving alphanumerically shaped pieces being cut to allow passage of light through the entire extent of the alphanumeric character of the piece.

4. A device as in claims 1, wherein the colors of said translucent piece in one plate are different from the colors of the pieces in the other plate section, and wherein a plurality of said translucent pieces represent alphanumeric characters, each of the characters represented being continuous and complete, said perforations receiving alphanumerically shaped pieces being cut to allow passage of light through the entire extent of the alphanumeric character of the piece.

* * * * *